US010926727B2

(12) United States Patent
Siddiqui

(10) Patent No.: US 10,926,727 B2
(45) Date of Patent: Feb. 23, 2021

(54) SMART SURFACE FOR DETECTING COLLISION FORCES

(71) Applicant: Qirfiraz Siddiqui, Castro Valley, CA (US)

(72) Inventor: Qirfiraz Siddiqui, Castro Valley, CA (US)

(*) Notice: Subject to any disclaimer, the term of this patent is extended or adjusted under 35 U.S.C. 154(b) by 49 days.

(21) Appl. No.: 16/162,948

(22) Filed: Oct. 17, 2018

(65) Prior Publication Data
US 2019/0111876 A1 Apr. 18, 2019

Related U.S. Application Data

(60) Provisional application No. 62/573,699, filed on Oct. 18, 2017.

(51) Int. Cl.
*B60R 21/0136* (2006.01)
*B60R 21/0132* (2006.01)
*B60R 21/01* (2006.01)

(52) U.S. Cl.
CPC ...... *B60R 21/0136* (2013.01); *B60R 21/0132* (2013.01); *B60R 2021/01006* (2013.01); *B60R 2021/01013* (2013.01); *B60R 2021/01088* (2013.01); *B60R 2021/01109* (2013.01); *B60R 2021/01322* (2013.01); *B60R 2021/01327* (2013.01)

(58) Field of Classification Search
CPC ............ B60R 21/0136; B60R 21/0132; B60R 2021/01013; B60R 2021/01327; B60R 2021/01088; B60R 2021/01109; B60R 2021/01322; B60R 2021/01006
See application file for complete search history.

(56) References Cited

U.S. PATENT DOCUMENTS

| 10,332,318 | B1* | 6/2019 | Leise | G06Q 10/20 |
| 2003/0182035 | A1* | 9/2003 | DiLodovico | G08G 1/164 |
| | | | | 701/32.2 |
| 2007/0043507 | A1* | 2/2007 | Tobaru | B60R 19/483 |
| | | | | 701/301 |
| 2008/0258887 | A1* | 10/2008 | Gelberi | B60R 21/0136 |
| | | | | 340/436 |
| 2010/0049398 | A1* | 2/2010 | Bryant | G01P 1/127 |
| | | | | 701/31.4 |

* cited by examiner

*Primary Examiner* — Peter D Nolan
*Assistant Examiner* — Ashley L Redhead, Jr.

(57) ABSTRACT

One example method of operation may include identifying a vehicle collision event via one or more sensors disposed in one or more sensor circuits affixed to a vehicle body of a vehicle via one or more multi-layered removable stickers, responsive to identifying the vehicle collision event, identifying vehicle collision event data including a geolocation of the vehicle and a timestamp of the vehicle collision event, and storing, in a wirelessly accessible memory of the one or more sensor circuits, the vehicle collision event data received during the vehicle collision event.

16 Claims, 10 Drawing Sheets

350

SMART SURFACE FOR DETECTING COLLISION FORCES

CROSS-REFERENCES TO RELATED APPLICATIONS

This application claims priority to provisional application No. 62/573,699, entitle "LOW RESOLUTION, TOUCH-SENSITIVE, MICRO-LOCATION ENABLED, NON-DISPLAYING, CONNECTED, SMART SURFACES & APPLICATIONS, which was filed on Oct. 18, 2017, the entire contents of which are hereby incorporated by reference.

TECHNICAL FIELD OF THE APPLICATION

This application relates to a smart surface, and more specifically to operations and procedures for implementing smart surfaces to detect and transmit collision forces to a tracking device and application.

BACKGROUND OF THE APPLICATION

Conventionally, collisions may occur to automobiles and other vehicles or constructs involved in transport on highways or other transport mediums, which can lead to dangerous collisions. For example, a car on the road, a container on a ship or train, etc., may all be vulnerable to collisions which can cause severe damage to the outside and inside of the vehicles. The damage is later examined by an insurance adjuster by a purely visual approach. Such an approach to accounting for damages can lead to fraud and other forms of falsifications since the amount of damage, at a particular time, may not always be easily identified by the adjuster. There is currently no simple way to record parameters, such as a time, collision impact strength, and other collision parameters, which can be used as a baseline to determine just when and how hard the collision was at the time of impact.

SUMMARY OF THE APPLICATION

Example embodiments of the present application provide at least a method that includes identifying a vehicle collision event via one or more sensor circuits affixed to a vehicle body of a vehicle, and the one or more sensors circuits include one or more accelerometers, estimating a position of the vehicle where the vehicle collision event occurred based on position data generated by the one or more accelerometers, and storing in a memory of the one or more sensor circuits, vehicle collision event data received during the vehicle collision event and based on the estimated position of the vehicle where the vehicle collision event occurred.

Another example embodiment may include an apparatus that provides a sensor circuit, with one or more accelerometers, a memory and a processor, and configured to identify a vehicle collision event via the one or more sensor circuits affixed to a vehicle body of a vehicle, the processor is configured to estimate a position of the vehicle where the vehicle collision event occurred based on position data generated by the one or more accelerometers, and the memory is configured to store vehicle collision event data received during the vehicle collision event and based on the estimated position of the vehicle where the vehicle collision event occurred.

Another example embodiment may include a method that includes identifying a vehicle collision event via one or more sensors disposed in one or more sensor circuits affixed to a vehicle body of a vehicle via one or more multi-layered removable stickers, responsive to identifying the vehicle collision event, identifying vehicle collision event data comprising a geolocation of the vehicle and a timestamp of the vehicle collision event, and storing, in a wirelessly accessible memory of the one or more sensor circuits, the vehicle collision event data received during the vehicle collision event.

Still another example embodiment may include an apparatus that includes a sensor enabled circuit, with one or more sensors, a wirelessly accessible memory and a processor, and the sensor enabled circuit is configured to identify a vehicle collision event via the one or more sensors affixed to a vehicle body of a vehicle via a multi-layered removable sticker, and the processor is further configured, responsive to identifying the vehicle collision event, to identify vehicle collision event data comprising a geolocation of the vehicle and a timestamp of the vehicle collision event, and the wirelessly accessible memory is configured to store the vehicle collision event data received during the vehicle collision event.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide an accelerometer-based smart sticker. Such a configuration may be a single two-dimensional surface, such as a magnet or sticker with an embedded relatively flat-surfaced circuit with a central controller and a grid of accelerometers and/or other sensors such as infra-sound microphones, which will detect a collision event, such as a vehicle accident. The data from the sensors may initiate a storing event that stores the collision parameters into a memory, which can later be shared with a third party device, such as a smartphone via a near-field communication (NFC) antenna module that wirelessly communicates with a NFC compatible feature of the smartphone for receiving the collision parameters to calculate a collision event, including time, collision area and/or other parameters to accurately identify when and where the vehicle was hit relative to the position of the sensors.

Figure 1:
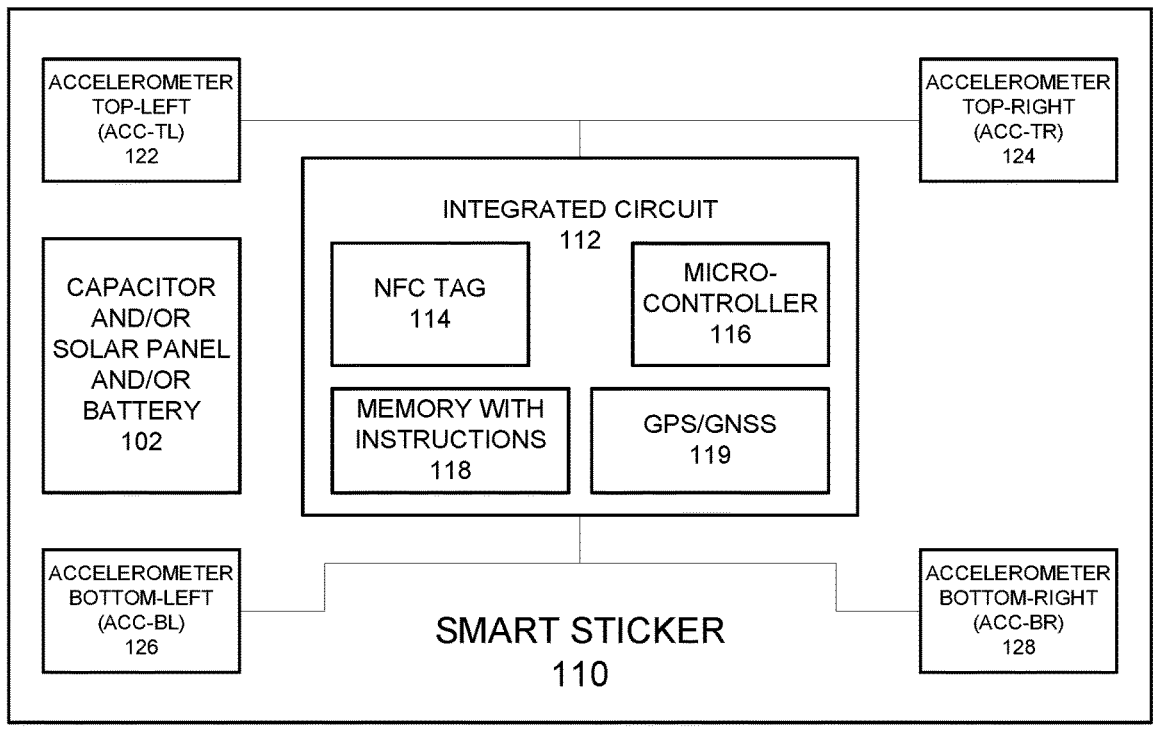
FIG. 1 illustrates an example sensor configuration circuit according to example embodiments.

FIG. 1 illustrates an example sensor configuration circuit according to example embodiments. Referring to FIG. 1, the example sensory circuit 100 includes four accelerometers, including one in a top-left position 122 of the sensory circuit, one in the top-right position 124, one in the bottom-left position 126 and one in the bottom-right position 128. The circuit may be part of a sticker, magnet or other type of substantially flattened surface that is affixed to the vehicle body, such as a bumper sticker 110, which may include a central integrated circuit 112 with the NFC tag 114 for performing low-power wireless communication to a third party device, a micro-controller/processor 116 for computing the logic/instructions to receive, process and transmit the data collected, a memory 118 to store the instructions and/or the data created during the collision. Another module which may be part of the embedded sticker module may include a global positioning satellite or global navigation satellite system (GPS/GNSS) module 119 to assist with a current vehicle location at the time of the accident. For power an capacitor, solar panel and/or battery 102 may be used to provide circuit power for storing, processing and/or wireless transmitting.

In operation, at the time of a collision the accelerometers 122-128 each separately record an infra-sound wave. This wave is produced by the colliding force, which is a three-dimensional vector (x, y, z) and thus all four accelerometers record the same waveform but with different x, y and z components due to different locations of the accelerometers on the sticker. As a result, just one impact event produces 12 different waveforms (e.g., four accelerometers multiplied by three axes of data per accelerometer). Although the 12 different waveforms are related to each other since they are produced by the same impact, each of the four accelerometers receive its own specific version of the waveform due to varying amplitudes and phase-angles of the wave when such data reaches the accelerometer sensors relative to the location of the "point of impact".

Figure 2:
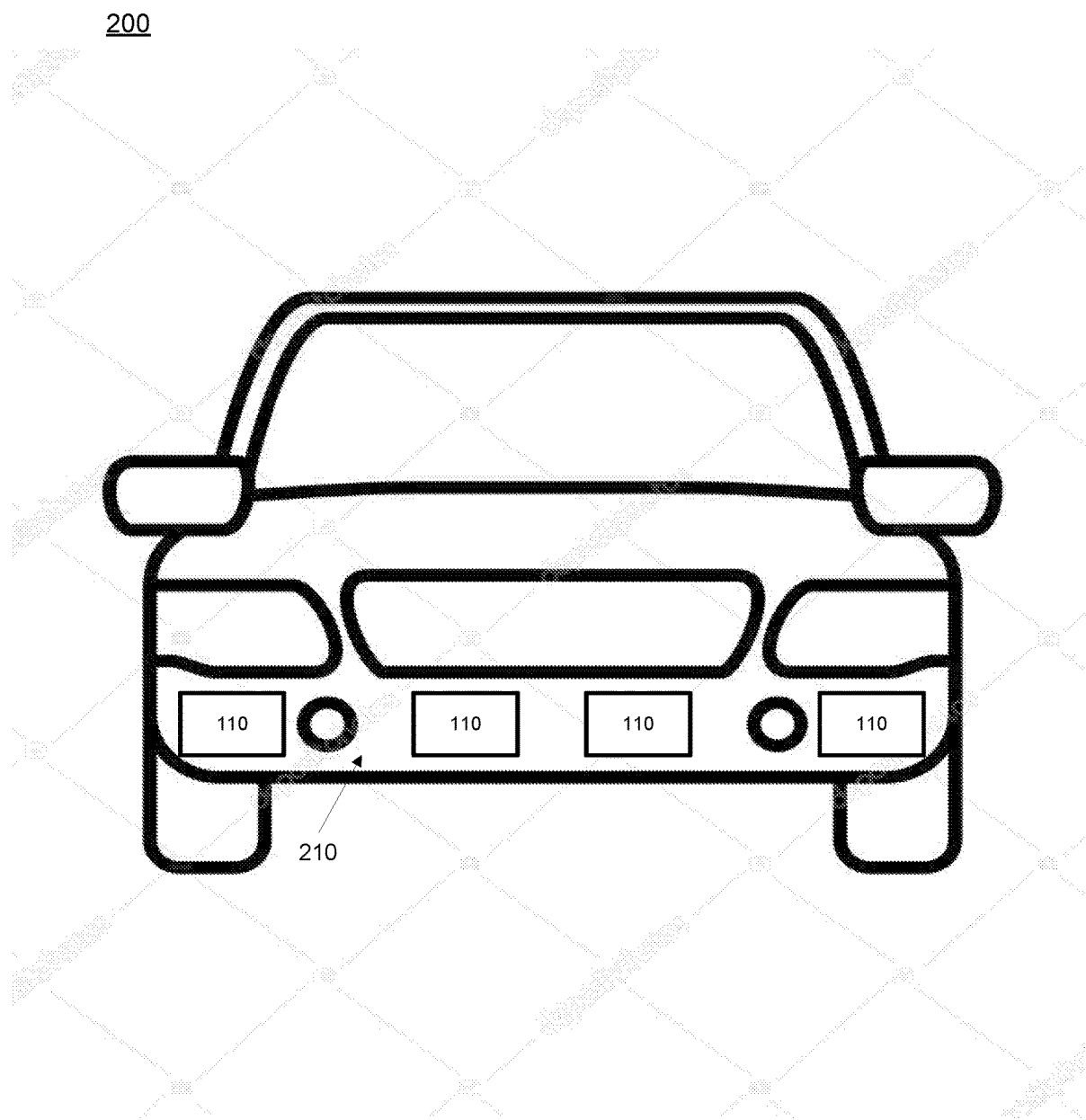
FIG. 2 illustrates example sensor configuration affixed to a vehicle bumper according to example embodiments.

FIG. 2 illustrates example sensor configuration affixed to a vehicle bumper according to example embodiments. Referring to FIG. 2, the configuration 200 includes a motor vehicle with a bumper 210 having a set of sensor modules 110, each of which can independently identify a collision event via changes to the sensors embedded in the body of the sticker panels which are affixed to the outside or inside of a vehicle bumper 210. When a collision occurs the data from each sticker panel can be readily accessed by a smartphone coming into contact with the NFC modules embedded in the sticker panel body. The NFC module may have a low-power one-time use transmission to the smartphone's NFC antenna module. The data in the memory can be extracted and used to enact a collision algorithm which takes the data from the plurality of accelerometer sensors, compares the data, identifies the time, and uses triangulation or other procedures for determining a relative impact force, an angle of the impact, etc., so the collision data is accurately detected and stored in memory until such information is ready to be shared with the third party smartphone device.

Figure 3A:
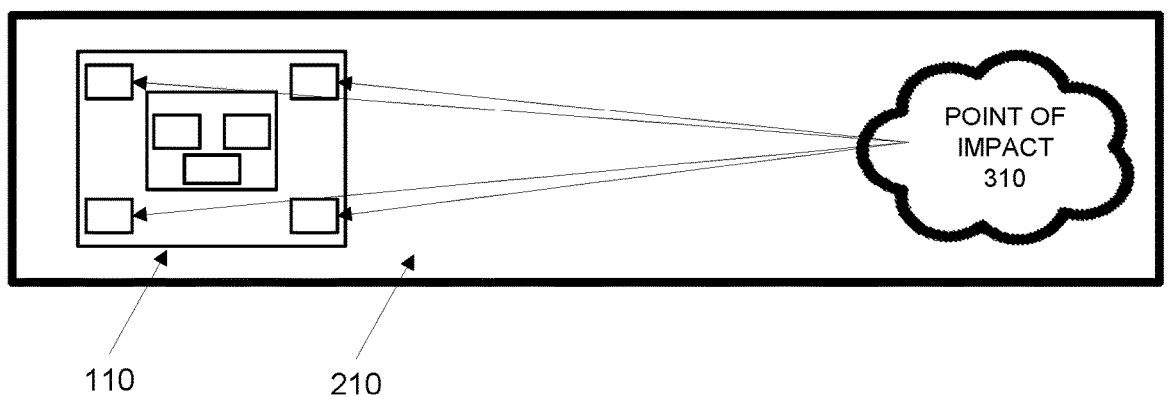
FIG. 3A illustrates an example sensor configuration receiving sensory data during a collision event according to example embodiments.

FIG. 3A illustrates an example sensor configuration receiving sensory data during a collision event according to example embodiments. Referring to FIG. 3A, the configuration 300 provides a bumper 210 with one sticker panel circuit 110 affixed to the bumper 210. In the event that an impact occurs at the point of impact area 310, the accelerometers inside the panel 110 may identify amplitude data, direction data, phase data, etc., which may be compared to the data for each sensor for accurate impact information.

The bumper 210 may be identified as a plane surface, a "phase-difference" may provide a y-coordinate, or vertical position, of a "point of impact" 310, while the amplitude-attenuation will be proportional to the x-coordinate or horizontal position of the point of impact. At any particular point in time, the microcontroller 116 reads 12 values (4 accelerometers×3 axes) from the waveform generated by the impact. The 12 values can form a "state-machine" which can be dynamically changed according to the wave-vector received at each of four accelerometers. The "state-machine" can be referred to as a sensor-actuated and dynamically-changing state-machine. The 12 variables of the state-machine are provided into a small "foot-print" learning embedded neural network. For example, for an 8-bit microcontroller, the 12 values will provide 96 (12×8) binary inputs to the embedded neural network. The embedded neural network will determine whether the collision actually occurred or whether the sensors have detected noise-vibration from un-related sources. When the collision is identified as having occurred then a point of impact can be identified from the shape/geometry of the bumper 210, a force of impact, a direction/angle of impact, a geo-location of the accident can also be obtained from a global positioning satellite or global navigation satellite system (GPS/GNSS) module 119, which may also be included in the electronic circuitry of the sticker module.

When detecting a time, a "date-time" clock may be set, when the sticker is first initialized by a NFC-enabled smartphone application, and other user-specific information may also be set as certain initialization parameters which are written into the memory of the dynamic NFC tag. Once the neural network determines that an accident has occurred, the microcontroller becomes active and gathers accident parameters and writes them into the memory of the sticker module along with previously initialized parameters, such as date, time, name, vehicle ID, insurance company, etc.

Using an NFC-enabled smartphone, the information stored in the memory 118 can be retrieved by a simple close encounter of the smartphone antenna with the sticker surface, which provides a data transmission to any interested recipient, such as an insurance agency, police, spouse, friends, witnesses, towing service, repair facility, body shop, etc.

In another example, the components of the circuit and corresponding sticker module may be built-in into the bumper 210 by the automobile manufacturer and/or spare/replacement-parts bumper manufacturers, etc, with next generation products. The neural network may be setup away from the sticker module housing, such as near the dashboard of the vehicle, or the roof-top of the vehicle, where more sensors may be used to provide additional sources of information. In this case, the neural network can send a wireless or wired signal to "the sticker" to initiate recording of the collision data. In another example, in addition to a grid of accelerometers and/or infra-sound microphones and/or motion sensors, the electronic circuitry in the smart sticker can also be attached to a low resolution, touch-sensitive, micro-location enabled non-displaying smart surface or connected surfaces.

In the example of a large shipping/trucking container, those constructs can also be equipped with similar sticker modules at each corner of the containers, and at other strategic locations/points on the containers where collision are likely to occur. Since trucking or shipping companies often have damage claims from shippers/manufacturers of goods which are transported, then the large-scale journeys made by those containers can be made unsupervised and across large distances, such as in inter-continental trade, without concern for documentation of the damaging situations which may occur. The sticker modules can provide a source of electronically-collected authentic evidence of activity in and around the shipped merchandise, and may also support or counter the evidence provided from other sources with regard to accidents.

Figure 3B:
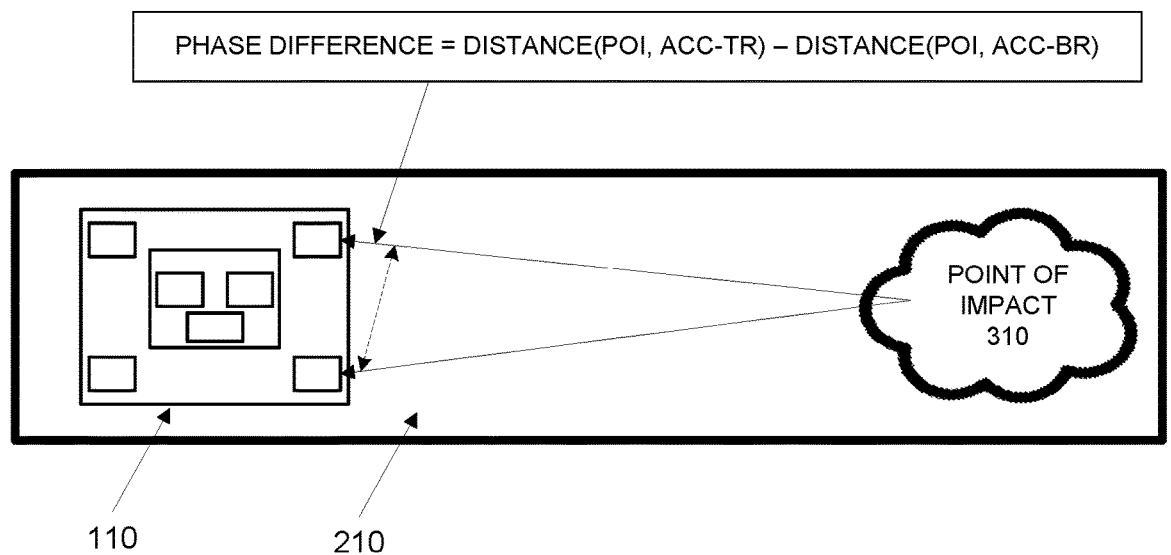
FIG. 3B illustrates an example sensor configuration receiving sensory data during a collision event by identifying a phase difference based on distances of the sensors with respect to the point of impact according to example embodiments.

FIG. 3B illustrates an example sensor configuration receiving sensory data during a collision event by identifying a phase difference based on distances of the sensors with respect to the point of impact according to example embodiments. Referring to FIG. 3B, the example 350 provides a scenario where impact signal information is identified by two or more of the sensors and a phase difference is calculated based on a distance between the point of impact and the top right sensor (i.e., accelerometer) and a distance between the point of impact and the bottom right sensor. This phase difference offers angle information about where the point of impact occurs and thus can be used by the recipient device to confirm a particular impact point at a particular time.

Figure 3C:
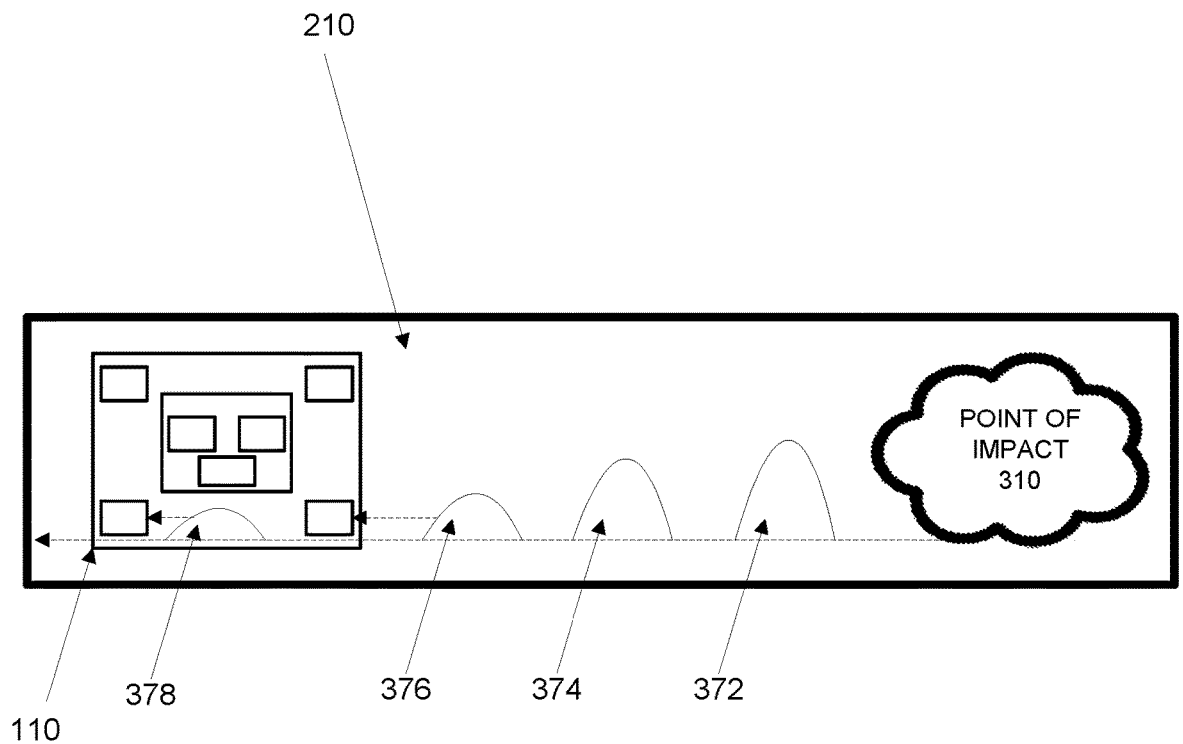
FIG. 3C illustrates an example sensor configuration receiving sensory data during a collision event by identifying an amplitude attenuation signal based on distances of the sensors with respect to the point of impact according to example embodiments.

FIG. 3C illustrates an example sensor configuration receiving sensory data during a collision event by identifying an amplitude attenuation signal based on distances of the sensors with respect to the point of impact according to example embodiments. In a similar manner to the example in FIG. 3B, the example 370 provides for measuring an amplitude of a collision sound/vibration wave at different sensors. In this example, the bottom right sensor is closer to the collision point of impact 310 and thus the wave amplitude of the signal (e.g., vibration, noise, etc.) is larger as detected at the bottom right sensor than at the bottom left sensor which receives the same signal further away and thus with additional amplitude loss than the signal amplitude received at the bottom right sensor.

Figure 4:
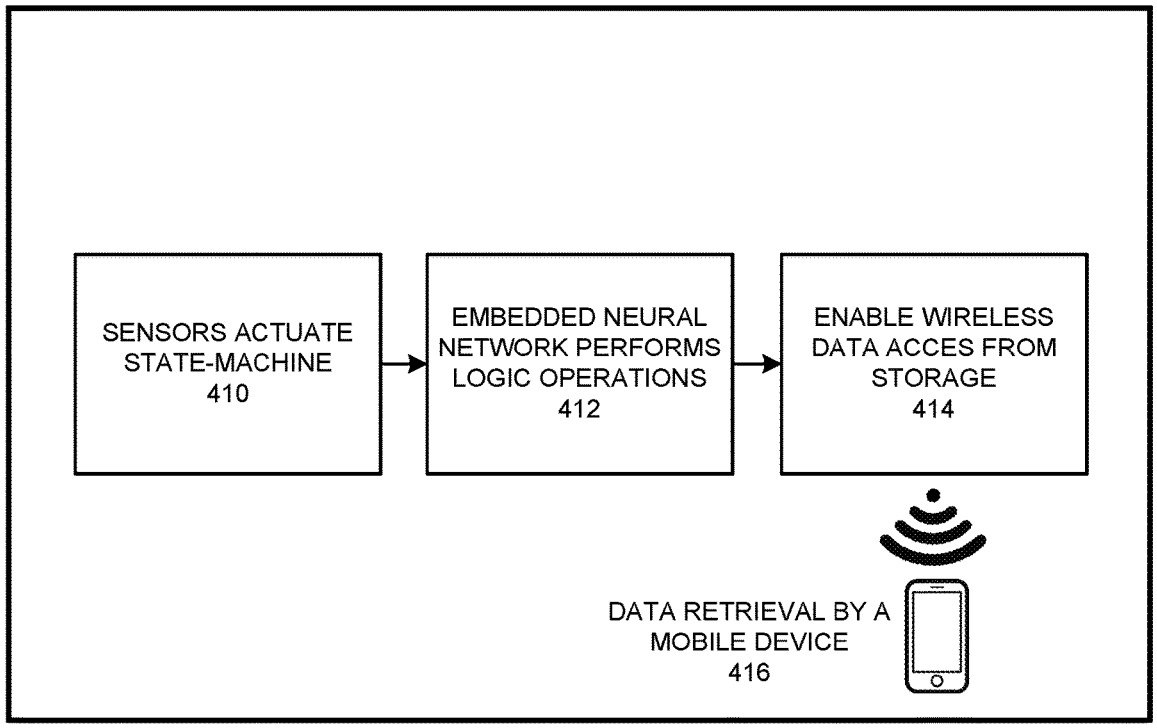
FIG. 4 illustrates a logic diagram of the components of the sensor configuration according to example embodiments.

FIG. 4 illustrates a logic diagram of the components of the sensor configuration according to example embodiments. Referring to FIG. 4, the logic diagram 500 includes a set of sensors 510 which actuate and cause the neural network logic 512 to perform certain predefined operations to receive, store and organize the data into a digital form so the wireless module can retrieve the information from a memory and provide it to a mobile device 516 that activates the wireless module to transmit the data at a later time.

The sensors may be considered a sensor-transducer block which collects data pertaining to specific activity-parameters and/or usage-monitoring units. The neural network 512 provides an electronic logical circuit to process sensor data and/or to decide upon the sensor data so a wireless (e.g., BLUETOOTH, NFC, WiFi, etc.) and accessible non-volatile memory unit can record sensor data and transmit the data to a third party device, such as a mobile device 516. One smart bumper sticker embodiment will include a single accelerometer with 3 outputs (i.e., x-axis, y-axis, z-axis) so motion/vibration along any of axes is detected and passed to a neural network circuit. The neural network may be a simple logic circuit with a single 3-input OR gate, and a single 2-input AND gate as illustrated in FIG. 5.

Figure 5:
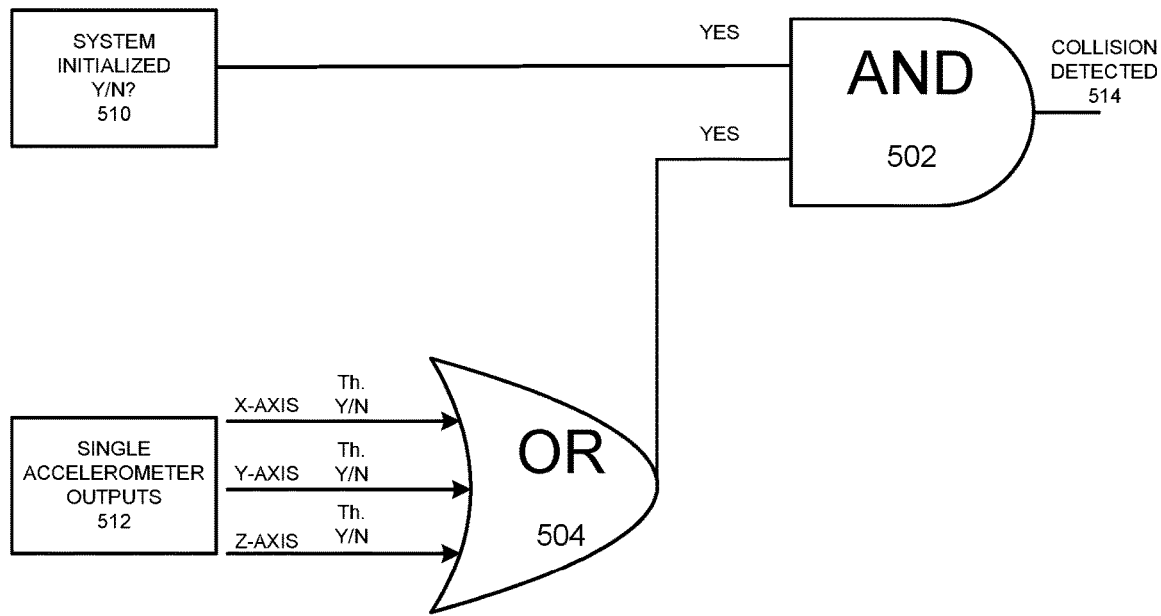
FIG. 5 illustrates an example neural network configuration demonstrating the logic used to identify collision data according to example embodiments.

FIG. 5 illustrates an example neural network configuration demonstrating the logic used to identify collision data according to example embodiments. Referring to FIG. 5, the neural network 500 includes an AND gate 502 which has a first digital input of an initialized system 510 and a second input as the output of the OR gate 504. The OR gate 504 includes three inputs as the accelerometer data 512 including the X, Y and Z axis data and whether a threshold has been exceeded or not. The output of the AND gate 502 is whether a collision has been detected 514.

As is evident from block diagram of FIG. 5, a collision is detected only if the circuitry is in the initialized state and any motion, above a certain pre-set motion level threshold, is detected along the X-axis, OR the Y-axis, OR the Z-axis. It is important that the circuitry should be in the initialized state because after an accident, the sticker memory goes into a "read only" state so that the collision data may not be over-written by mistake. However, after the collision data has been retrieved, the electronic circuit can be re-initialized so that it is able to write another collision data set into the sticker memory module. The accelerometer can be replaced with other sensors, such as infra-sound microphones or other types of motion/vibration detectors.

In other examples, the main input from the sensors to the state machine is from a grid of accelerometers where a microcontroller triangulates the location of impact on the bumper from multiple sensor data. In certain examples, the actuating sensors are a grid of accelerometers, infra-sound microphones, and/or GPS receivers. The embedded neural network will determine that an accident/collision has occurred and appropriate recording will then be initiated by the output of the logic of the data logic. Regardless of the collision-detection logic or the embedded neural network, the common functionalities of the smart bumper stickers may include pressure/motion sensor/transducers, collision a data recording ability, a battery-less configuration, an energy harvesting operation, an embedded memory in a dynamic NFC tag, smartphone compatibility, notification ready design, an easy insurance claim filing process with companion device applications, and customizable designs.

In operation, the smart bumper sticker will be placed on automobile bumpers to record vital data when a collision or accident occurs. The data is stored in tiny memory modules embedded in the sticker. The data contains information pertaining to a force of the impact, the direction of the impact, as well as the date, time and geo-location of the collision. The product is an extremely low-powered device with energy harvesting capabilities, and a wafer-thin body, an electrical charge storing capacitor, which may act as a battery and which can last for a long time.

Retrieving the collision data is achieved through an NFC-enabled smartphone operating a companion application, which can also be used to transmit the collision data to insurance agencies and/or to other interested parties. This will also reduce the paperwork and administrative cost of claim system management. The sticker is specifically designed for automobile bumpers, but with very slight modifications, it can be used on any surface which needs to be protected from tampering and which requires tracking of event data.

Figure 6A:
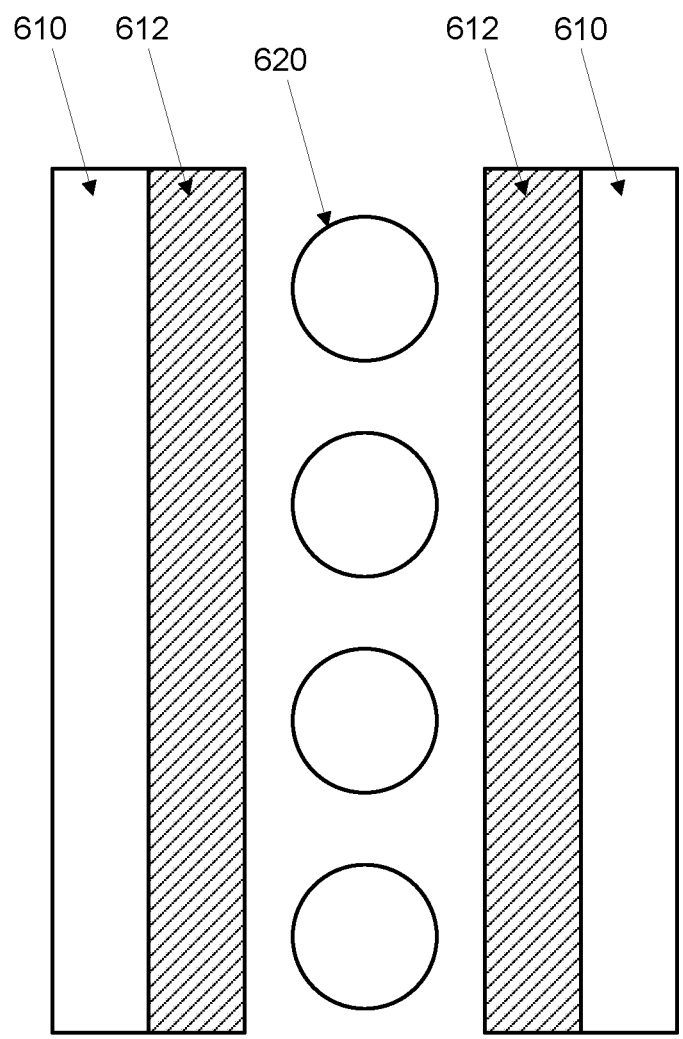
FIG. 6A illustrates another example embodiment of a sensor configuration using a resistive layer of conductive material.

FIG. 6A illustrates another example embodiment of a sensor configuration using a resistive layer of conductive material. Referring to FIG. 6A, this embodiment demonstrates a grid of sensory material 600 with two overlaid sheets of flexible plastic or similar material as a protective layer 610, and as an opaque or transparent material, each of which is coated with a resistive layer substrate 612, and both sheets are separated by a grid of spacer dots 620, which can serve as an inexpensive micro-location enabled surface which can communicate x and y coordinates of any touch-point area which is activated by creating a circuit short which permits an electrical current to pass and be recorded as to a location where the signal is identified with respect to the entire surface.

In this example, the touch-detection materials and touch position determining algorithm are the same as those used by resistive touch screens in smartphones and tablets. However, the surfaces of this implementation are very different in design, purpose and application. For example, these surfaces have no functionality to display anything, such as liquid crystal display (LCC) screens or other smart device display screens using similar technologies. The surfaces do not vie for high resolution precision. Actually, in most of the applications, these surfaces will need only single digit resolution. For example, a resolution of four grid elements per square inch should be enough to pin point the exact location of the collision. The surfaces use inexpensive materials, such as ordinary plastic or other polymerized hydro-carbon sheets, because the use is intended to be a one-time collision detection use strategy. In the example embodiment of a "smart bumper sticker" the micro-location of a collision is determined only once, that is when the collision occurred.

The grid may be an un-powered, or low-powered, proximity-sensor-enabled, bumper sticker, to automatically record and/or report vehicle collision data. Auto insurance companies spend a large amount of resources in investigating insurance claims pertaining to vehicle collisions. An un-powered, or low-powered, proximity-sensor-enabled, bumper sticker, or a combination of some other low-cost sensors, to automatically record and/or report vehicle collision data, will help reduce the cost of claim investigation.

Selectively placed, a grid of connected sensors on an easily replaceable bumper sticker can be used to easily capture, time and impact of a collision, and with a carefully designed reporting system, an authenticated insurance claim system can be devised, which may result in huge savings to claim authenticity and accuracy. This data can be recorded locally or can be transmitted to the insurance provider, directly, in real time. The bumper stickers can be placed on other strategic positions on the vehicles, beside the bumpers. The stickers may be placed on internal vehicle components in hidden places to capture data in more aggressive collisions for legal purposes. Solar energy can be used to power the stand-alone sensors/tags, but otherwise, connected tags/beacons/sensors may draw their minimal operational power from the vehicle battery sources, on-board batteries and/or small electrical capacitors.

The tag may use piezo-electric energy generated by the impact or any other energy harvesting technique. The tags/beacons/sensors can be placed in a multitude of grid patterns so as to cover all possible points of collision. The signal processing electronic circuitry can reside behind the bumper or within the license-plate frame or even in the head/tail lights housing, which are already connected to a power source of the vehicle. In one embodiment, this bumper-sticker will include a grid of resistive meshed wires, coupled with two pairs of wires to monitor x and y co-ordinates of grid elements, which are broken due to collision impact.

Another example may be a two-layer ordinary plastic sheet coated with in-expensive conductive material. Both layers are separated by spacer dots which allow contact between the two layers only due to impact of the collision. Relative time-difference between the collapsing of the adjacent grid elements can be used to deduce the force and direction of impact. Depending upon the x and y coordinate calculations performed, and also on the technology used in the actual sticker, four or more wires will provide the necessary connectivity between the "bumper-sticker" and the electronic circuitry governing the micro-controller.

Figure 6B:
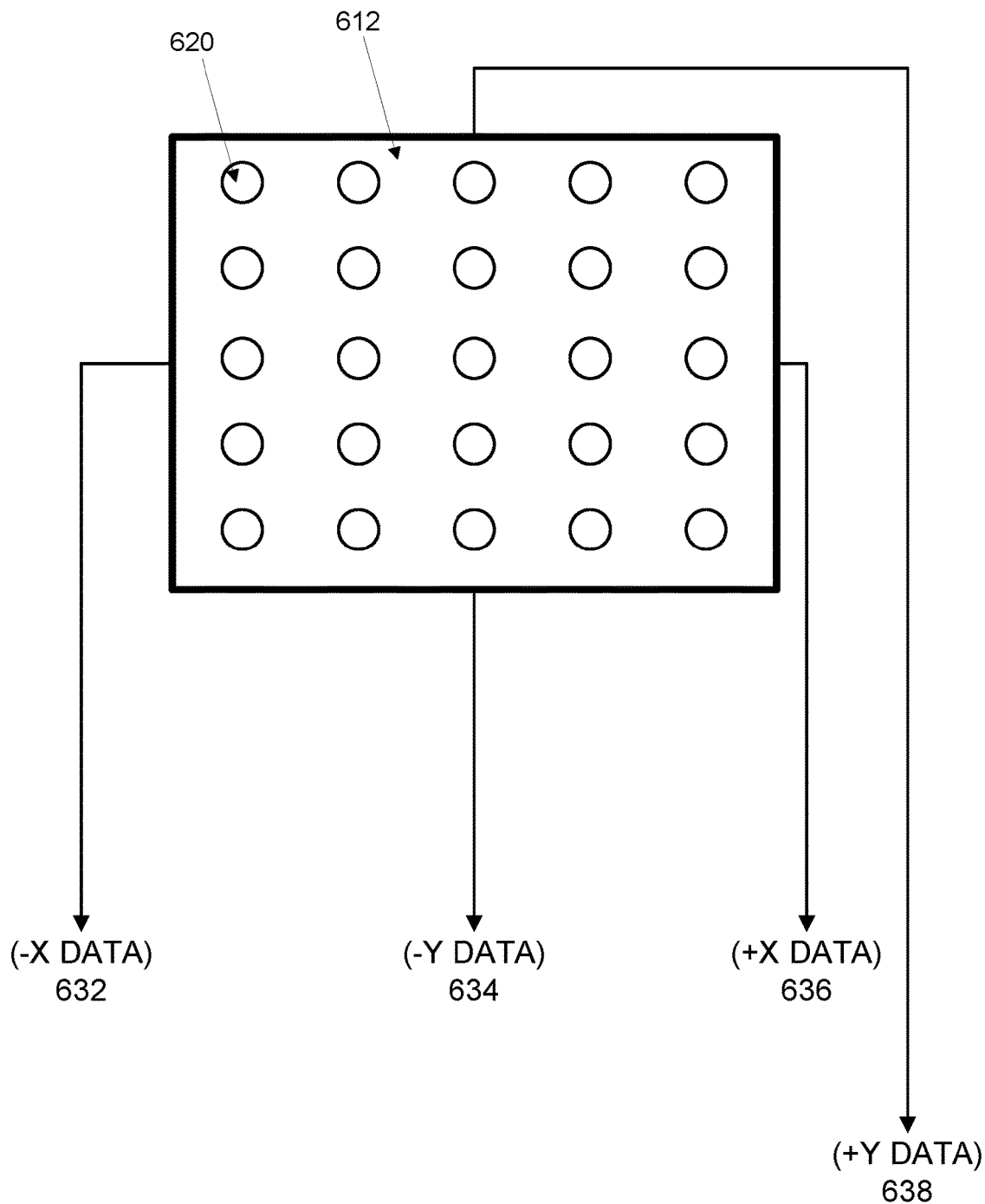
FIG. 6B illustrates the sensor configuration using the resistive layer of conductive material with various data points.

FIG. 6B illustrates the sensor configuration using the resistive layer of conductive material with various data points. Referring to FIG. 6B, the example 650 provides the grid of resistive material 612 with holes 620 having four wires extend from the stickers representing –x 632, +x 636, –y 634, +y 638 data co-ordinates, which will be fed into a low-powered or preferably energy harvesting but otherwise low-end micro-controller system connected to a dynamic or simple/regular NFC tag or BLE beacon or some other similar sensor.

A choice of additional electronic functionality will be optional. An 8-pin controller is enough to perform necessary computing, while an unpowered simplest possible NFC tag may store and transmit the collision data to a NFC-enabled smartphone. The direction and speed of a collision can be deduced by a timestamp at which the adjacent grid elements were affected by the collision. Thus, the force of collision will be inversely proportional to the value (t1-t2) where t1 and t2 are the timestamps at which adjacent grid elements were struck in the accident. The planar distance between the planes of two adjacent grid elements, will also be taken into consideration, while determining the force and direction of impact. Similarly, the sequence in which adjoining grid elements were struck will also determine the direction of the impact. The planar distance between the planes of two adjacent grid elements, will also have be taken into consideration, while determining the force and direction of the impact.

Data collected by the smart bumper sticker can be processed by the attached micro-controller and the values can be easily written into the memory of the connected NFC tag, which also provides the mechanism to transfer information to an NFC-enabled smartphone. A smart-bumper sticker can also be "initialized" by the smartphone application which can write the vehicle identification information in the connected NFC tags and memory. In this scenario, if both vehicles are equipped with smart bumper stickers, then at the time of collision, this identification information can also be exchanged between the colliding vehicles, using NFC peer-to-peer NDEF exchange functionality. The electronic circuitry to process the collision data can be housed behind the license-plate or can be placed with head/tail lights. This will be convenient in power-intensive applications because, headlights as well as lice se plates are already using or are near an automobile's power source.

The sensors in the smart sticker may detect that a collision has occurred. After that, the electronic circuitry initiates and begins recording collision data, such as the geolocation where the collision occurred, including latitude and longitude and a time and date the collision occurred (i.e., timestamp). The geolocation may be based on GPS coordinates. Such information will be stored in the sensor circuit in the memory so insurance agencies will be able to retrieve that information at a later time. A smartphone may retrieve that information, wirelessly, by just a "tap" procedure with the smart sticker to initiate a NFC wireless communication.

The purpose of accelerometer as a sensor type may be to detect a collision and initiate the recording of data. A single accelerometer can also be used to detect a collision and can also identify certain noises and vibrations, which could be misunderstand as an accident. So multiple accelerometers can be used to create a grid which serves as a "infra-sound" sensor because instead of recording a single value at the time of impact, this grid of sensors may record a waveform over a short period, (milliseconds) after the collision. This waveform not only provides more information about the collision, but also ascertains that it is an actual collision, and not a false-vibration generated by outside noise. With the help of sensor-accelerometer grid, more collision details can be identified which is all secondary information. Other sensors may include an infra-sound microphone, or a liquid-based (e.g., mercury) vibration-detector, motion sensor or other sensor, which can replace the accelerometer in the smart sticker sensor module.

Figure 7:
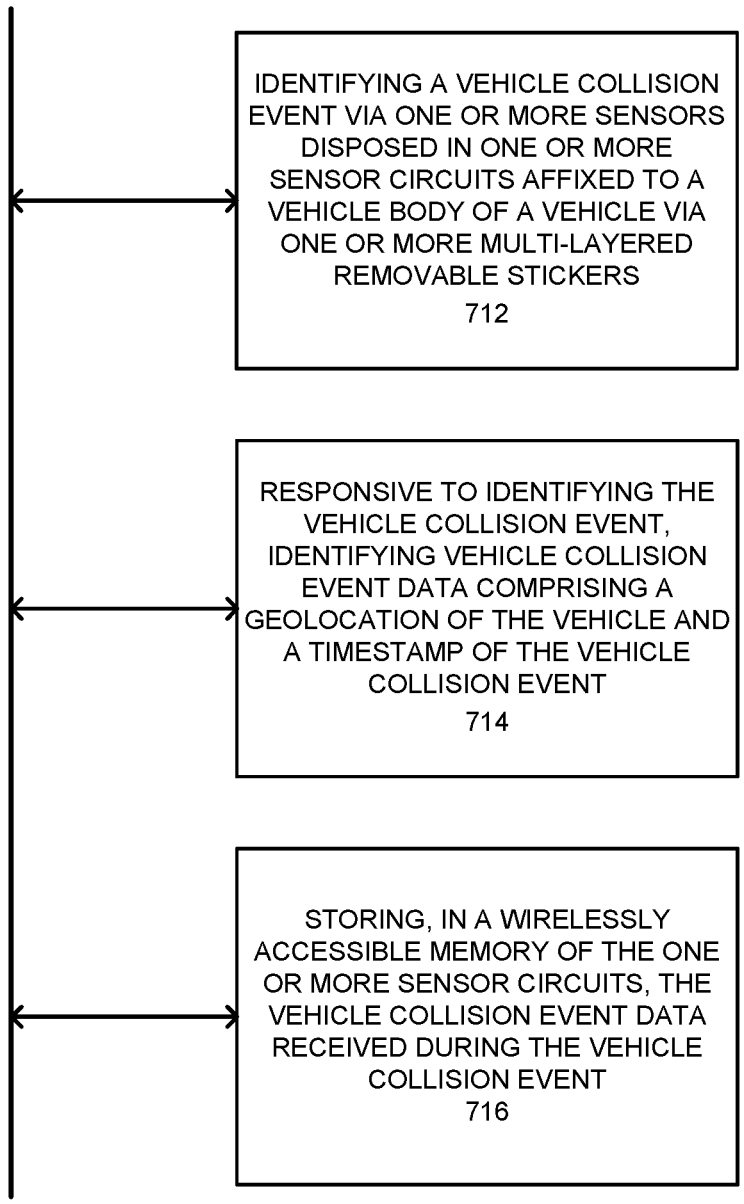
FIG. 7 illustrates a flow diagram of an example method of operation according to example embodiments.

FIG. 7 illustrates a flow diagram of an example method of operation according to example embodiments. Referring to FIG. 7, the method 700 includes identifying a vehicle collision event via one or more sensors disposed in one or more sensor circuits affixed to a vehicle body of a vehicle via one or more multi-layered removable stickers 712, responsive to identifying the vehicle collision event, identifying vehicle collision event data comprising a geolocation of the vehicle and a timestamp of the vehicle collision event 714, and storing, in a wirelessly accessible memory of the one or more sensor circuits, the vehicle collision event data received during the vehicle collision event 716.

The method may include estimating a portion of the vehicle body of the vehicle where a point of impact occurred based on the vehicle collision event data generated by the one or more sensors which comprise one or more accelerometers. The method may also include performing a triangulation between the one or more accelerometers of the one or more sensor circuits based on two or more axis directions which were affected by collision movement during the vehicle collision event. The method may further include receiving waveform data of a detected waveform, via the one or more accelerometers, due to varying amplitudes and phase-angles of the detected waveform, when the collision movement reached the accelerometers relative to a location of impact of the vehicle collision event, and determining the point of impact based on the varying amplitudes and phase-angles of the detected waveform. The method may also include transmitting the vehicle collision event data, via a wireless communication module stored in the one or more sensors circuits, to a third party wireless device. The wireless communication module may be a near field communication (NFC) module. The one or more sensor circuits may include a low resolution, touch-sensitive, micro-location enabled non-displaying smart surface. The one or more sensors may include one or more of an infra-sound microphone, a liquid-based vibration-detector, a motion sensor and an accelerometer.

Another example may include an apparatus that includes a sensor enabled circuit, having one or more sensors, a wirelessly accessible memory and a processor, wherein the sensor enabled circuit is configured to identify a vehicle collision event via the one or more sensors affixed to a vehicle body of a vehicle via a multi-layered removable sticker, and the processor is further configured, responsive to identifying the vehicle collision event, to identify vehicle collision event data comprising a geolocation of the vehicle and a timestamp of the vehicle collision event, and the wirelessly accessible memory is configured to store the vehicle collision event data received during the vehicle collision event.

Other operations may provide performing a triangulation between the one or more accelerometers of the one or more sensor circuits based on two or more axis directions which were affected by collision movement during the vehicle collision event. Receiving waveform data of a detected waveform, via the one or more accelerometers, due to varying amplitudes and phase-angles of the detected waveform, when the collision movement reached the accelerometers relative to a location of impact of the vehicle collision event, and determining the position data based on the varying amplitudes and phase-angles of the detected waveform.

Other operations may include transmitting the vehicle event data, via a wireless communication module stored in the one or more sensors circuits, to a third party wireless device. The wireless communication module may include a near field communication (NFC) module. The one or more sensor circuits further include a low resolution, touch-sensitive, micro-location enabled non-displaying smart surface.

Another example embodiment may include an apparatus that provides a sensor circuit, having one or more accelerometers, a memory and a processor, and configured to identify a vehicle collision event via the one or more sensor circuits affixed to a vehicle body of a vehicle, the processor is configured to estimate a position of the vehicle where the vehicle collision event occurred based on position data generated by the one or more accelerometers, and the memory is configured to store vehicle collision event data received during the vehicle collision event and based on the estimated position of the vehicle where the vehicle collision event occurred.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   identifying a vehicle collision event via one or more sensors disposed in one or more sensor circuits of a multi-layered removable sticker affixed to an external vehicle body;
   responsive to detecting a point of impact via the one or more sensors, determining a phase difference, based on distances of the one or more sensors with respect to the point of impact, measured from one accelerometer and one or more additional accelerometers disposed in corners of the multi-layered removable sticker; and
   responsive to identifying the vehicle collision event, storing vehicle collision event data comprising a geo-location of the vehicle and a timestamp of the vehicle collision event in a wirelessly accessible memory of the one or more sensor circuits.

2. The method of claim 1, further comprising:
   estimating a portion of the vehicle body of the vehicle where the point of impact occurred based on the vehicle collision event data generated by the one or more sensors which comprise the accelerometers.

3. The method of claim 2, further comprising:
   performing a triangulation between the accelerometers of the one or more sensor circuits based on two or more axis directions which were affected by collision movement during the vehicle collision event.

4. The method of claim 3, further comprising:
   receiving waveform data of a detected waveform, via the accelerometers, due to varying amplitudes and phase-angles of the detected waveform, when the collision movement reached the accelerometers relative to a location of impact of the vehicle collision event; and
   determining the point of impact based on the varying amplitudes and phase-angles of the detected waveform.

5. The method of claim 1, further comprising:
transmitting the vehicle collision event data, via a wireless communication module stored in the one or more sensors circuits, to a third party wireless device.

6. The method of claim 5, wherein the wireless communication module comprises a near field communication (NFC) module.

7. The method of claim 1, wherein the one or more sensor circuits further comprise a low resolution, touch-sensitive, micro-location enabled non-displaying smart surface.

8. The method of claim 1, wherein the one or more sensors further comprise one or more of an infra-sound microphone, a liquid-based vibration-detector, and a motion sensor.

9. An apparatus comprising:
a sensor enabled circuit, comprising one or more sensors, a wirelessly accessible memory and a processor, wherein the sensor enabled circuit is disposed in a multi-layered removable sticker affixed to an external vehicle body of a vehicle and is configured to identify a vehicle collision event via the one or more sensors,
responsive to detection of a point of impact via the one or more sensors, the processor is configured to
determine a phase difference, based on distances of the one or more sensors with respect to the point of impact, measured from one accelerometer and one or more additional accelerometers disposed in corners of the multi-layered removable sticker; and
responsive to the vehicle collision event being identified, store the vehicle collision event data comprising a geolocation of the vehicle and a timestamp of the vehicle collision event in the wirelessly accessible memory.

10. The apparatus of claim 9, wherein the processor is configured to estimate a portion of the vehicle body of the vehicle where the point of impact occurred based on the vehicle collision event data generated by the one or more sensors which comprise the accelerometers.

11. The apparatus of claim 10, wherein the processor is configured to perform a triangulation between the accelerometers of the sensor enabled circuit based on two or more axis directions which were affected by collision movement during the vehicle collision event.

12. The apparatus of claim 11, wherein accelerometers are configured to receive waveform data of a detected waveform due to varying amplitudes and phase-angles of the detected waveform, when the collision movement reached the accelerometers relative to a location of impact of the vehicle collision event, and determine the position data based on the varying amplitudes and phase-angles of the detected waveform.

13. The apparatus of claim 9, wherein the sensor circuit further comprises a wireless communication module configured to transmit the vehicle event data to a third party wireless device.

14. The apparatus of claim 13, wherein the wireless communication module comprises a near field communication (NFC) module.

15. The apparatus of claim 9, wherein the sensor circuit further comprises a low resolution, touch-sensitive, micro-location enabled non-displaying smart surface.

16. The apparatus of claim 9, wherein the one or more sensors further comprise one or more of an infra-sound microphone, a liquid-based vibration-detector, and a motion sensor.

* * * * *